Patented June 17, 1924.

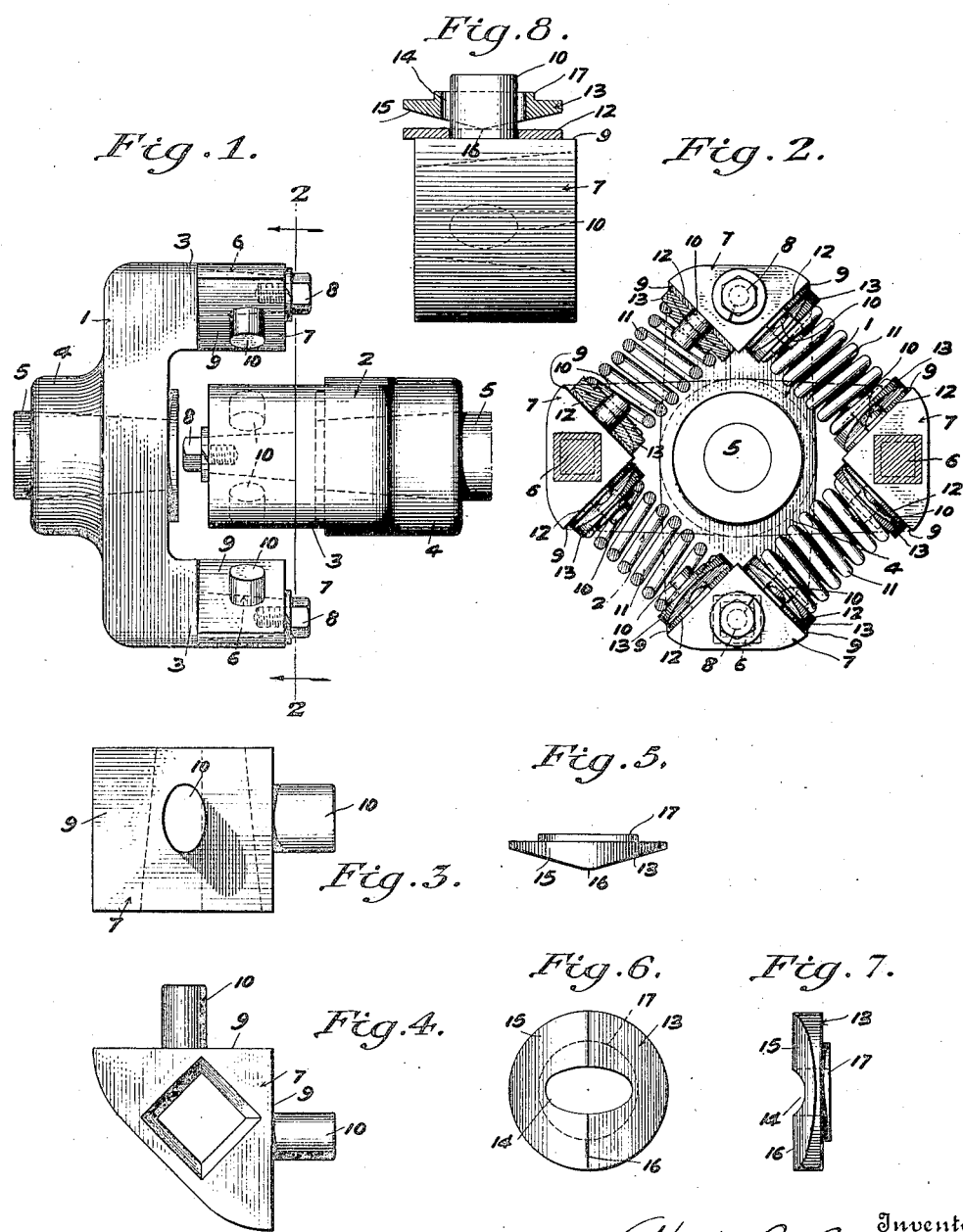

1,498,072

UNITED STATES PATENT OFFICE.

ALFRED B. BREEZE, OF CINCINNATI, OHIO, ASSIGNOR TO THE CINCINNATI BALL CRANK COMPANY, OF CINCINNATI, OHIO, A CORPORATION OF OHIO.

UNIVERSAL JOINT.

Application filed June 11, 1920. Serial No. 388,226.

*To all whom it may concern:*

Be it known that I, ALFRED B. BREEZE, a citizen of the United States, and residing at Cincinnati, in the county of Hamilton and State of Ohio, have invented a new and useful Improvement in Universal Joints, of which the following specification is a full disclosure.

My invention relates to a flexible universal joint or shaft coupling particularly adapted for connecting the shaft sections of the power shaft of a motor vehicle.

An object of the invention is to provide a simple, durable and reliable, flexible and universal connection for rotatively connecting the ends of the shafts or shaft sections, and which does not require lubrication nor housing in a lubricant-tight housing.

Another object is to provide a spring shaft coupling in which the ends of the spring or springs are engaged against an oscillating seat member, and further, in which the oscillating spring seat member has an edge or curved bearing end rotative with the torsion of the spring.

Further objects and features, some relating to structural details, will definitely appear in the detailed description of the accompanying drawings, illustrating the preferred embodiments of the invention, forming a part of this specification, and in the drawings like characters of reference denote corresponding parts throughout the several views, of which:

Figure 1 is a side elevation of my improved flexible universal joint, the springs of the same being removed.

Fig. 2 is a sectional view taken on line 2, 2, Fig. 1.

Figs. 3 and 4 are respectively plan and side detail views of the spring and keeper blocks.

Figs. 5, 6 and 7 are respectively side, plan and edge detail views of the spring seat.

Fig. 8 is a sectional view illustrating the position of the spring seat relative to the keeper block and pin thereon.

Referring to Figs. 1 to 8 of the drawings, which arrangement of a flexible universal joint is selected for the purpose of illustrating one embodiment of the invention, primarily adapted for connecting two sections of a drive shaft in a motor vehicle and consisting of a pair of duplicate yoke or fork members 1, 2, arranged for disposing the arms 3, 3, of one yoke member at right angles to the arms 3, 3, of the opposite or second yoke member. Each yoke member is provided with a central hub or flange portion 4, having a tapering base therethrough to receive the end of shaft 5 to which the yoke member is secured.

The method of securing the shaft to the yoke member is however optional, the one shown being of a standard type commercially employed by many automobile or auto-parts manufacturers.

The yoke or fork members as cooperating or connecting the ends of a pair of coaxial shafts or sections may, with the respective shafts to which they are secured, be referred to as the driving and driven elements of the coupling, and as many duplicate parts as are employed in making up the coupling, and such parts will be described in the singular.

Each yoke arm has projecting from its forward end a stud 6, integral or rigid with the arm to provide a non-movable support for a spring seat block 7, mortised to engage over the stud as a tenon, to non-rotatably and removably secure the block upon the end of the yoke arm. The block is secured upon the stud against lateral displacement by a screw or pin 8, threaded in the end of the stud, and is provided with a pair of plane faces 9, 9, disposed at right angles to each other, with a pin or pintle 10 centrally projected from each face. One face 9 of a block, or one arm of a yoke member, thus extends in a plane parallel to a corresponding face of a block or an arm of the second yoke member, between which a spring 11 is engaged as an intermediate compressible and laterally flexible connection between the opposing yokes of the coupling. A hardened washer 12 is engaged over the pin 10, of the block, abuttingly against the face 9, to provide a renewable bearing surface for the spring seat 13 engaged with the end of the spring 11. The seat 13 is provided with an oval or enlarged central bore 14, through which the block pin 10 is engaged, and its outer face 15 is tapered or bevelled to provide a diameter apex 16 as a bearing edge engaged against the bearing washer 12, permitting the seat to rock or swing upon the washer with the flexible or bending motions of the spring. This furnishes a swivelled and universal connection for the spring with the keepr block or yoke arm, the seat being free to oscillate about the pin 10 as an axis. The opposite face of the seat has a projecting hub portion 17, which engages with the end convolution of the spring, for confining the end of the spring laterally upon the seat.

To make up the coupling unit, four springs (more or less) are employed, two extending at right angles to each other from each keeper block or yoke arm, of one yoke member respectively, to the corresponding sides of the yoke arms of the second yoke member, rotatively connecting or uniting said yoke members and permitting a plurality of yielding torques, and a flexible thrust connection between the driving and driven members of the universal joint, which adapts the connected shafts to be journaled at an angle to one another and to a degree to meet all the requirements demanded for its use in a motor vehicle.

Thus the joint or flexible, as well as the universal connections for the ends of two shafts, in which the bearing engagement between the connected parts are edge bearings, permit free oscillation to compensate for the thrust motions, neutralizing the forces between the connected driving and driven member, so that approximately only rotary motion is transmitted from one transmission member to the other.

The keeper blocks are principally employed as a means for permitting the convenient assembly of the parts of the coupling, although it is obvious that these blocks may be eliminated and the ends of the yoke arms correspondingly formed to receive the springs, but in practise it has been found very difficult to insert the springs, as it is necessary to confine to a degree the ends of the springs with their engaged member, to prevent the lateral displacement, which would allow the spring to snap outwardly and destroy the utility of the coupling.

With the use of the removable keeper blocks, the blocks and springs can be first conveniently and quickly assembled within an appropriate clamping device and then compressed, so as to occupy the position between the blocks of the opposing yoke members under the required degree of tension for a determined horse-power drive, after which, and while held under clamp, the blocks are inserted over or engaged upon the studs projecting from the yoke arms.

This construction provides a laterally, flexible, rotatively yielding universal joint, requiring no lubrication nor to be housed within a lubricant-tight casing. It relieves the transmitting of sudden starting torques from one to the other of the connected shafts in either direction of rotation and accommodates for end thrusts, thereby avoiding the use of a sliding connection, requiring lubrication, as well as being very simple and compact, and cheaply manufactured on account of its number of duplicate parts and small number of different parts, possessing advantages in rendering the device adaptable for and in making repairs.

Having described my invention, I claim:

A driving and driven member organized to constitute a substantial shaft coupling, each member comprising a pair of oppositely disposed arms, overlapping in their plan of rotation, and each arm providing faces at right angles to one another, each face having an elliptic lug thereon, with its long axis laterally disposed to the plane of rotation of said members, spring seat members having knife edges engaging said faces, oscillatable laterally of the plane of rotation of said members, about said elliptic lugs, and springs engaging with alternate seat members to yieldingly connect said driving and driven members.

In witness whereof, I hereunto subscribe my name, as attested by the two subscribing witnesses.

ALFRED B. BREEZE.

Witnesses:
CLIFFORD GREENE,
A. HOLLINGER.